(12) United States Patent
Sharp et al.

(10) Patent No.: US 11,269,123 B2
(45) Date of Patent: Mar. 8, 2022

(54) HOLLOW TRIPLE-PASS OPTICAL ELEMENTS

(71) Applicants: Gary D. Sharp, Boulder, CO (US); Anthony D. McGettigan, Santa Rosa, CA (US)

(72) Inventors: Gary D. Sharp, Boulder, CO (US); Anthony D. McGettigan, Santa Rosa, CA (US)

(73) Assignee: GARY SHARP INNOVATIONS, LLC, Boulder, OH (US)

( * ) Notice: Subject to any disclaimer, the term of this patent is extended or adjusted under 35 U.S.C. 154(b) by 0 days.

(21) Appl. No.: 16/260,903

(22) Filed: Jan. 29, 2019

(65) Prior Publication Data

US 2019/0235145 A1 Aug. 1, 2019

Related U.S. Application Data

(60) Provisional application No. 62/623,493, filed on Jan. 29, 2018.

(51) Int. Cl.
| | |
|---|---|
| *G02B 5/30* | (2006.01) |
| *G02B 27/09* | (2006.01) |
| *G02B 3/00* | (2006.01) |
| *G02B 27/28* | (2006.01) |

(52) U.S. Cl.
CPC ............ *G02B 5/3025* (2013.01); *G02B 3/00* (2013.01); *G02B 27/0977* (2013.01); *G02B 27/28* (2013.01)

(58) Field of Classification Search
CPC ........ G02B 5/3025; G02B 27/28; G02B 3/00; G02B 27/0977
See application file for complete search history.

(56) References Cited

U.S. PATENT DOCUMENTS

| | | | |
|---|---|---|---|
| 4,511,225 | A | 4/1985 | Lipson |
| 4,884,876 | A | 12/1989 | Lipton |
| 5,132,826 | A | 7/1992 | Johnson et al. |
| 5,231,521 | A | 7/1993 | Johnson et al. |
| 5,243,455 | A | 9/1993 | Johnson et al. |
| 5,381,253 | A | 1/1995 | Sharp et al. |
| 5,387,958 | A | 2/1995 | Pashley |
| 5,493,426 | A | 2/1996 | Johnson et al. |

(Continued)

*Primary Examiner* — Wen Huang
(74) *Attorney, Agent, or Firm* — Robert G. Crouch

(57) ABSTRACT

Hollow optical elements that derive optical power from compound-curved reflective surfaces to produce a desired composite optical power. The reflective surfaces in combination with polarization control, can produce a triple-pass arrangement that determines the optical power. Two functional films, one or both of which are formed (e.g., thermoformed), can be joined at the perimeter to form units that are mechanically robust and therefore preserve optical performance under mechanical load. The air-spaced cavity formed between the two layers is free of birefringence concerns, where polarization control is crucial to contrast. These optical elements can be installed in frames or headsets to form lightweight wearable magnifiers, wide-angle collimators, tele-photo lenses, or for any application requiring optical power. They may be most appropriate for applications where light efficiency is not critical, such as well-lit environments, where the insertion-loss of 1 to 2 stops is not problematic.

12 Claims, 8 Drawing Sheets

(56) References Cited

U.S. PATENT DOCUMENTS

| | | |
|---|---|---|
| 5,528,393 A | 6/1996 | Sharp et al. |
| 5,552,912 A | 9/1996 | Sharp et al. |
| 5,574,553 A | 11/1996 | McManamon et al. |
| 5,619,355 A | 4/1997 | Sharp et al. |
| 5,627,666 A | 5/1997 | Sharp et al. |
| 5,658,490 A | 8/1997 | Sharp et al. |
| 5,689,317 A | 11/1997 | Miller |
| 5,715,023 A | 2/1998 | Hoppe |
| 5,751,384 A | 5/1998 | Sharp |
| 5,781,268 A | 7/1998 | Liu et al. |
| 5,822,021 A | 10/1998 | Johnson et al. |
| 5,870,159 A | 2/1999 | Sharp |
| 5,892,559 A | 4/1999 | Sharp |
| 5,892,612 A | 4/1999 | Miller |
| 5,929,946 A | 7/1999 | Sharp et al. |
| 5,953,083 A | 9/1999 | Sharp |
| 5,990,996 A | 11/1999 | Sharp |
| 5,999,240 A | 12/1999 | Sharp et al. |
| 6,028,656 A | 2/2000 | Buhrer |
| 6,046,786 A | 4/2000 | Sharp et al. |
| 6,049,367 A | 4/2000 | Sharp et al. |
| 6,075,651 A * | 6/2000 | Hoppe ............... G02B 27/0172 359/15 |
| 6,078,374 A | 6/2000 | Sharp et al. |
| 6,091,462 A | 7/2000 | Sharp et al. |
| 6,097,461 A | 8/2000 | Sharp |
| 6,141,069 A | 10/2000 | Sharp et al. |
| 6,141,071 A | 10/2000 | Sharp |
| 6,172,722 B1 | 1/2001 | Sharp |
| 6,183,091 B1 | 2/2001 | Johnson et al. |
| 6,252,638 B1 | 6/2001 | Johnson et al. |
| 6,273,571 B1 | 8/2001 | Sharp et al. |
| 6,310,673 B1 | 10/2001 | Sharp |
| 6,380,997 B1 | 4/2002 | Sharp et al. |
| 6,417,892 B1 | 7/2002 | Sharp et al. |
| 6,452,646 B1 | 9/2002 | Sharp et al. |
| 6,638,583 B1 | 10/2003 | Sharp et al. |
| 6,650,377 B2 | 11/2003 | Robinson et al. |
| 6,667,784 B2 | 12/2003 | Sharp et al. |
| 6,704,065 B1 | 3/2004 | Sharp et al. |
| 6,707,516 B1 | 3/2004 | Johnson et al. |
| 6,735,017 B1 | 5/2004 | Acosta |
| 6,816,309 B2 | 11/2004 | Chen et al. |
| 6,882,384 B1 | 4/2005 | Sharp |
| 6,899,430 B2 | 5/2005 | Johnson et al. |
| 6,922,221 B2 | 7/2005 | Zhu |
| 6,961,179 B2 | 11/2005 | Chen et al. |
| 6,961,181 B2 | 11/2005 | Chen et al. |
| 7,002,752 B2 | 2/2006 | Chen et al. |
| 7,083,282 B1 | 8/2006 | Sharp et al. |
| 7,106,509 B2 | 9/2006 | Sharp |
| 7,126,649 B2 | 10/2006 | Chen et al. |
| 7,154,667 B2 | 12/2006 | Birge et al. |
| 7,195,356 B1 | 3/2007 | Sharp |
| 7,298,386 B1 | 11/2007 | Sharp et al. |
| 7,345,723 B2 | 3/2008 | Robinson et al. |
| 7,436,476 B2 | 10/2008 | Sharp et al. |
| 7,510,280 B2 | 3/2009 | Sharp |
| 7,511,787 B2 | 3/2009 | Sharp |
| 7,528,906 B2 | 5/2009 | Robinson et al. |
| 7,545,469 B2 | 6/2009 | Robinson et al. |
| 7,583,439 B2 | 9/2009 | Tsai |
| 7,692,746 B2 | 4/2010 | Sharp |
| 7,898,603 B2 | 3/2011 | Sharp |
| 7,898,734 B2 | 3/2011 | Coleman et al. |
| 7,905,602 B2 | 3/2011 | Schuck et al. |
| 8,004,758 B2 | 8/2011 | Coleman et al. |
| 8,072,681 B2 | 12/2011 | Coleman et al. |
| 8,085,644 B2 | 12/2011 | Sharp |
| 8,169,699 B2 | 5/2012 | Petersen et al. |
| 8,184,215 B2 | 5/2012 | Osterman et al. |
| 8,194,315 B2 | 6/2012 | Sharp et al. |
| 8,220,934 B2 | 7/2012 | Schuck et al. |
| 8,233,034 B2 | 7/2012 | Sharp et al. |
| 8,328,362 B2 | 12/2012 | Coleman et al. |
| 8,330,911 B2 | 12/2012 | Hong |
| 8,403,488 B2 | 3/2013 | Schuck et al. |
| 8,408,708 B2 | 4/2013 | Sharp |
| 8,425,041 B2 | 4/2013 | Sharp et al. |
| 8,427,394 B2 | 4/2013 | Sharp et al. |
| 8,488,240 B2 | 7/2013 | Petersen et al. |
| 8,526,106 B2 | 9/2013 | Coleman |
| 8,540,372 B2 | 9/2013 | Coleman |
| 8,630,037 B1 | 1/2014 | Osterman |
| 8,638,400 B2 | 1/2014 | Sharp |
| 8,659,828 B2 | 2/2014 | Sharp |
| 8,687,275 B2 | 4/2014 | Coleman |
| 8,711,477 B2 | 4/2014 | Coleman |
| 8,724,218 B2 | 5/2014 | Curtis |
| 8,727,536 B2 | 5/2014 | Schuck |
| 8,746,876 B2 | 6/2014 | Sharp |
| 8,757,806 B2 | 6/2014 | Schuck |
| 8,760,760 B2 | 6/2014 | Coleman |
| 8,794,764 B2 | 8/2014 | Schuck |
| 8,820,937 B2 | 9/2014 | Osterman et al. |
| 8,833,943 B2 | 9/2014 | Schuck |
| 8,851,680 B2 | 10/2014 | Sharp |
| 8,891,042 B1 | 11/2014 | Osterman et al. |
| 8,908,081 B2 | 12/2014 | Davis |
| 8,941,801 B2 | 1/2015 | Robinson |
| 9,046,755 B2 | 6/2015 | Sharp |
| 9,057,880 B2 | 6/2015 | Curtis |
| 9,086,578 B2 | 7/2015 | Curtis |
| 9,110,363 B2 | 8/2015 | Petersen |
| 9,121,999 B2 | 9/2015 | Yan |
| 9,146,454 B2 | 9/2015 | Coleman |
| 9,167,236 B2 | 10/2015 | Sharp |
| 9,223,142 B2 | 12/2015 | Schuck |
| 9,229,139 B2 | 1/2016 | Osterman et al. |
| 9,235,057 B2 | 1/2016 | Robinson |
| 9,310,618 B2 | 4/2016 | Curtis |
| 9,316,865 B2 | 4/2016 | Osterman et al. |
| 9,350,980 B2 | 5/2016 | Robinson |
| 9,380,220 B2 | 6/2016 | Davis |
| 9,383,590 B2 | 7/2016 | Sharp |
| 9,457,523 B2 | 10/2016 | Coleman |
| 9,459,463 B2 | 10/2016 | Sharp |
| 9,530,397 B2 | 12/2016 | Sharp |
| 9,554,125 B2 | 1/2017 | Schuck |
| 9,594,298 B2 | 3/2017 | Schuck |
| 9,618,765 B2 | 4/2017 | Sharp |
| 9,625,745 B2 | 4/2017 | Sharp |
| 9,664,945 B2 | 5/2017 | Liu |
| 9,680,132 B1 | 6/2017 | Tsai |
| 9,686,474 B2 | 6/2017 | Davis |
| 9,709,883 B2 | 7/2017 | Sharp |
| 9,740,016 B2 | 8/2017 | Schuck |
| 9,823,561 B2 | 11/2017 | Sharp |
| 9,854,180 B2 | 12/2017 | Davis |
| 9,910,207 B2 | 3/2018 | Robinson |
| 9,933,631 B2 | 4/2018 | Osterman et al. |
| 9,933,636 B2 | 4/2018 | Sharp |
| 9,946,088 B2 | 4/2018 | Robinson |
| 10,012,884 B2 | 7/2018 | Osterman et al. |
| 10,049,627 B2 | 8/2018 | Schuck |
| 10,054,851 B2 | 8/2018 | Sharp |
| 10,082,675 B2 | 9/2018 | Sharp |
| 10,129,484 B2 | 11/2018 | Davis |
| 10,187,588 B2 | 1/2019 | Davis |
| 10,203,511 B2 | 2/2019 | Schuck |
| 10,393,946 B2 | 8/2019 | Robinson |
| 10,394,040 B2 | 8/2019 | Gollier |
| 10,401,700 B2 | 9/2019 | Osterman et al. |
| 10,416,461 B2 | 9/2019 | Gollier |
| 10,429,927 B1 * | 10/2019 | Sharma ............... G02B 27/0093 |
| 10,474,229 B1 | 11/2019 | Gollier |
| 10,495,798 B1 | 12/2019 | Peng |
| 10,502,981 B2 | 12/2019 | Sharp |
| 10,520,772 B1 | 12/2019 | Lu |
| 10,539,829 B1 | 1/2020 | Lu |
| 10,545,348 B1 | 1/2020 | Lu |
| 10,571,719 B1 | 2/2020 | McCabe |
| 10,598,928 B1 | 3/2020 | Lam |
| 10,598,945 B1 | 3/2020 | Lu |

(56) References Cited

U.S. PATENT DOCUMENTS

| | | |
|---|---|---|
| 10,600,352 B1 | 3/2020 | Wheelwright |
| 10,609,364 B2 | 3/2020 | Geng |
| 10,614,767 B2 | 4/2020 | Sharp |
| 10,630,908 B2 | 4/2020 | Davis |
| 10,642,048 B2 | 5/2020 | Peng |
| 10,670,861 B2 | 6/2020 | Gollier |
| 10,670,928 B2 | 6/2020 | Shi |
| 10,678,057 B2 | 6/2020 | Lu |
| 10,678,116 B1 | 6/2020 | Lam |
| 10,690,930 B1 | 6/2020 | Lu |
| 10,691,198 B1 | 6/2020 | Gollier |
| 10,705,401 B1 | 7/2020 | Lu |
| 10,712,485 B1 | 7/2020 | Lam |
| 10,739,611 B2 | 8/2020 | Sharp |
| 10,739,651 B2 | 8/2020 | Sharp |
| 10,809,585 B1 | 10/2020 | Lu |
| 10,838,214 B2 | 11/2020 | Chen |
| 10,839,609 B2 | 11/2020 | Sears |
| 10,845,597 B1 | 11/2020 | Gollier |
| 10,866,429 B2 | 12/2020 | Sharp |
| 10,871,653 B1 | 12/2020 | Osterman et al. |
| 10,890,823 B1 | 1/2021 | Jiang |
| 10,895,675 B2 | 1/2021 | Sharp |
| 10,901,205 B1 | 1/2021 | Lu |
| 10,902,820 B2 | 1/2021 | Peng |
| 10,914,953 B1 | 2/2021 | Lam |
| 10,928,698 B2 | 2/2021 | Osterman et al. |
| 10,934,381 B2 | 3/2021 | Lu |
| 10,935,790 B2 | 3/2021 | Lu |
| 10,935,804 B1 | 3/2021 | Lu |
| 2016/0109730 A1 | 4/2016 | McDowall |
| 2017/0068100 A1* | 3/2017 | Ouderkirk ............... G02C 7/081 |
| 2018/0039004 A1 | 2/2018 | Yun |
| 2018/0039052 A1 | 2/2018 | Khan |
| 2018/0101020 A1* | 4/2018 | Gollier ................ G02B 27/022 |
| 2018/0210223 A1 | 7/2018 | Sharp et al. |
| 2018/0259692 A1 | 9/2018 | Sharp |
| 2018/0284459 A1* | 10/2018 | Calm ....................... G02B 5/30 |
| 2019/0018177 A1 | 1/2019 | Sharp |
| 2019/0235145 A1 | 8/2019 | Sharp |
| 2019/0235300 A1 | 8/2019 | Sharp |
| 2019/0265467 A1 | 8/2019 | Yun |
| 2019/0271853 A1 | 9/2019 | Sharp |
| 2019/0302479 A1 | 10/2019 | Smyth |
| 2019/0377176 A1 | 12/2019 | Sharp |
| 2019/0377182 A1 | 12/2019 | Sharp |
| 2019/0377183 A1 | 12/2019 | Sharp |
| 2019/0377184 A1 | 12/2019 | Sharp |
| 2020/0096780 A1* | 3/2020 | Ouderkirk .......... G02B 17/0856 |
| 2020/0116912 A1 | 4/2020 | Sharp |
| 2020/0142276 A1 | 5/2020 | McGettigan |
| 2020/0241305 A1 | 7/2020 | Ouderkirk |
| 2020/0241312 A1 | 7/2020 | McGettigan |
| 2020/0379155 A1 | 12/2020 | Sharp |
| 2020/0409183 A1 | 12/2020 | Saylor |
| 2021/0041711 A1 | 2/2021 | Sharp |

* cited by examiner

HOLLOW TRIPLE-PASS OPTICAL ELEMENTS

CROSS-REFERENCE TO RELATED APPLICATIONS

This application claims priority to U.S. Provisional Application No. 62/623,493, filed Jan. 29, 2018, the contents of which are incorporated herein by reference in its entirety.

BACKGROUND

Eyewear lenses with significant refractive power are typically heavy and uncomfortable to wear over long periods of time. High refractive index polymers can mitigate this, but not completely solve the issue when high power is needed. Moreover, there are multiple applications where high optical power is required in a compact arrangement and weight is an issue. This may include any wearable, but also applications such as drones, where mass of a payload is paramount.

The prior art discloses arrangements that utilize polarization to create a triple-pass compact magnifier, or a wide-angle collimator (WAC). The triple-pass occurs in a cavity formed between an input partial reflector and an output reflective polarizer. In the first pass of the cavity, the reflective polarizer acts as a mirror. Light returned by the reflective polarizer is then converted to the orthogonal state-of-polarization (SOP) after reflection from the partial reflector. For example, the double-pass of a quarter-wave (QW) retarder in the cavity converts a linear SOP to the orthogonal SOP. Converted light is then transmitted by the reflective polarizer. In arrangements using reflective polarizers with linear eigenpolarizations, an input circular polarizer can be used external to the cavity. Optical power can be derived via reflection from the partial reflector, reflection from the reflective polarizer, or both.

It is against this background that the techniques described herein have been developed.

SUMMARY

Disclosed herein is an optical system that includes a first optical element through which light enters the optical system and a second optical element retained against the first optical element. At least one of the first optical element and the second optical element are non-planar. A hollow cavity is formed between the first optical element and the second optical element. Each of the first optical element and the second optical element reflect light such that light passes at least three times through the hollow cavity before exiting the optical system via the second optical element.

The first optical element may include a quarter-wave retarder and a partial reflector. The second optical element includes a quarter-wave retarder and a reflective polarizer. The first optical element may also include a polarizer. At least one of the first optical element and the second optical element may be convex. At least one of the first optical element and the second optical element may be concave.

The system may further include a support substrate attached to at least one of the optical elements. The support substrate may be an isotropic substrate. The support substrate may be a resin. The hollow cavity may be at least partially filled with an isotropic optical fluid. The system may further include an exit polarizer adjacent the second optical element. The second optical element may include a planar quarter-wave retarder and a non-planar reflective polarizer. The first optical element and the second optical element may be joined together along perimeters thereof.

Also disclosed here in an optical system that includes a first optical element through which light enters the optical system, the first optical element including a quarter-wave retarder and a partial reflector; and a second optical element held in a fixed position relative to the first optical element, with a hollow cavity formed between the first optical element and the second optical element, the second optical element including a quarter-wave retarder and a reflective polarizer. At least one of the first optical element and the second optical element are non-planar. Each of the first optical element and the second optical element reflect light such that light passes at least three times through the hollow cavity before exiting the optical system via the second optical element.

The first optical element may also include a polarizer.

Further disclosed herein is an optical system that includes a first optical element through which light enters the optical system, the first optical element including a quarter-wave retarder and a partial reflector; and a second optical element through which light exits the optical system, the second optical element held in a fixed position relative to the first optical element, with a hollow cavity formed between the first optical element and the second optical element, the second optical element including a quarter-wave retarder and a reflective polarizer. At least one of the first optical element and the second optical element are non-planar. Each of the first optical element and the second optical element reflect light back into the hollow cavity at least one time.

The first optical element may also include a polarizer.

DETAILED DESCRIPTION

Figure 1:
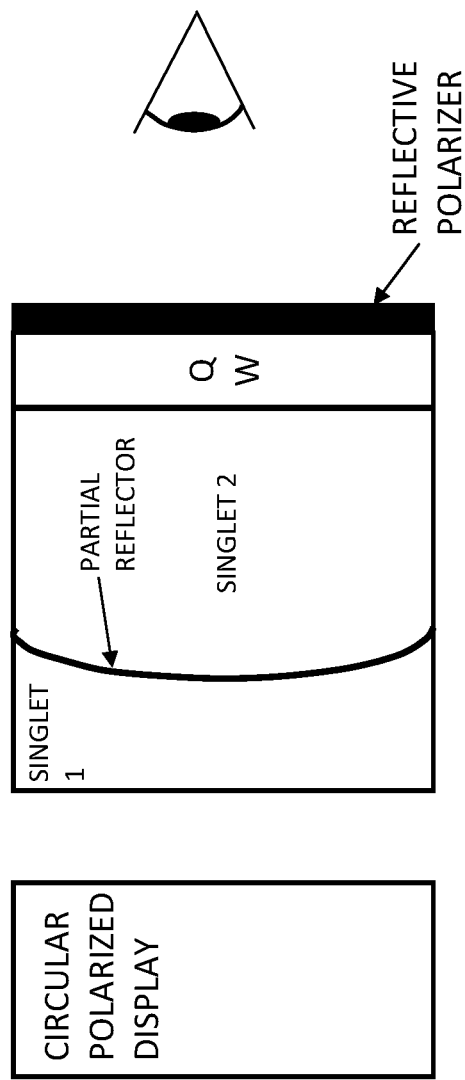
FIG. 1 shows a prior art wide-angle collimator.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

FIG. 1 shows a prior art WAC, consisting of a display with a circular polarized output, a pair of cemented singlets with a partially-reflective coating on one surface, a QW retarder, and a plano reflective (e.g., 3M DBEF) polarizer. In this case, optical power is derived entirely from the reflection that occurs at the concave surface of the partial reflector. The singlets are glass elements. Typical displays do not have an intrinsic circularly-polarized output. An LCD usually has a linearly-polarized output, where a QW retarder can be added to convert to a circularly-polarized state. An organic light-emitting diode (OLED) display often has a circular polarizer (QW facing the display) for blocking (e.g., ambient) light incident on the output-surface. In this case a QW is again required on the output side to convert to a circular SOP. For more general inputs, such as using the WAC as a magnifier of natural light, the input may be unpolarized. The invention contemplates an arbitrary input polarization, or degree of polarization. This means that the function of the unit is incorporated into the first and second layers of the WAC.

Glass elements may be preferred in a WAC design due to the need for precise polarization management and optical quality. But this can produce structures that are heavy and, for example, uncomfortable to wear on the face. Polymers are lighter, but birefringence in polymers can damage the polarization management and introduce stray light and ghost images. In general, solid optical elements facilitate conventional lamination of films onto the plano surface, supporting the functional layers and ensuring robust performance. However, apart from acting as carrier substrates, these elements may serve no purpose, while adding weight and birefringence.

In a particular embodiment, taught herein is a hollow triple-pass (HTP) system that performs as a stand-alone unit; performing the desired optical function regardless of the input degree of polarization. The HTP includes two functional layers (first and second optical elements) that are joined together to form an air-spaced optical cavity. Layer 1 contains a partially reflective layer, and Layer 2 contains a reflective polarizer. Layers 1 and 2 may have a different radius of curvature, such that a prescribed optical power is achieved in triple-pass. As can be appreciated, incoming light passes initially through Layer 1 and through the cavity where it impinges upon Layer 2. This is the first pass of the light through the cavity. The light is reflected from the reflective polarizer of Layer 2 back through the cavity where it impinges upon Layer 1. This is the second pass of the light through the cavity. The light is reflected from the partially reflective layer (partial reflector) of Layer 1 back through the cavity where it impinges upon Layer 2. This is the third pass of the light through the cavity. At this point, the light passes through Layer 2 and exits the HTP system.

Figure 2:
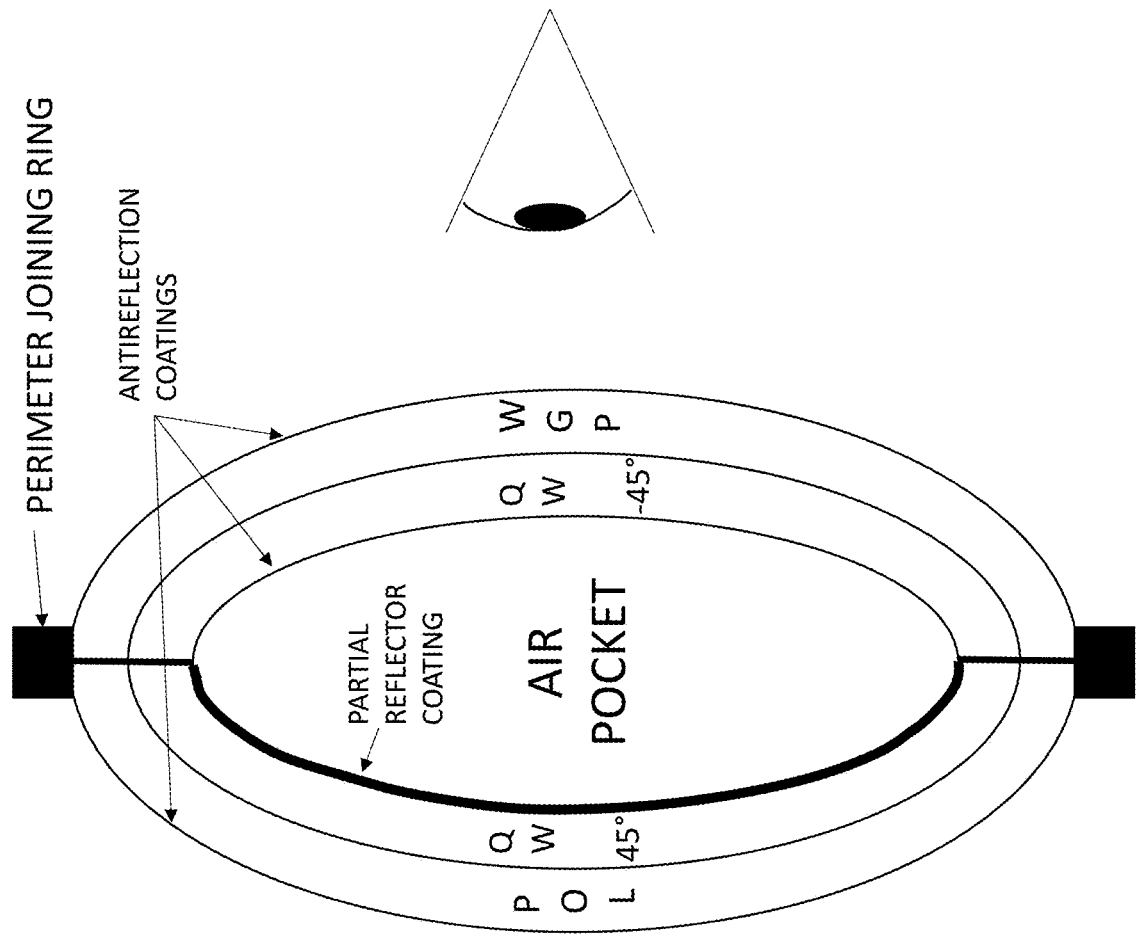
FIG. 2 shows a triple-pass optical system as described herein.

FIG. 2 shows an example of an embodiment, where both Layer 1 and Layer 2 have compound curvature. Layer 1 may be fabricated as a flat laminate, containing an input linear polarizer, a QW retarder (QW1) oriented at 45° to the absorption axis, a partial reflector, and possibly additional substrates for mechanical support. Layer 2 may also be fabricated as a flat laminate, containing a QW retarder (QW2) oriented at −45°, a reflective polarizer (e.g., Asahi-Kasei wire grid polarizer (WGP)), oriented with reflection-axis crossed with the absorption axis of the input polarizer, and possibly additional substrates for mechanical support. It can be appreciated that light passes into the optical system and is polarized by the input polarizer before passing through QW1 and then through the partial reflector and into the cavity. This is the only pass of light through QW1. The circularly polarized light passes through the cavity and impinges upon QW2 where it is converted to linear polarized light and is reflected by the wire grid polarizer back through QW2, where the light is again converted to circularly polarized light. This is the second pass of light through QW2. The circularly polarized light passes through the cavity and impinges upon the partial reflector where it is reflected and passes back through the cavity for a third time. The circularly polarized light impinges upon QW2 where it is converted to linearly polarized light of the proper orientation to pass through the wire grid polarizer and exit the optical system. That represents the third pass through QW3. Also, it can be seen that light is reflected once by the partial reflector and once by the reflective (wire grid) polarizer.

Circular parts can be die cut from the mother-sheet of each laminate and thermoformed to a desired radius of curvature. In the event that a thermoformed Layer 1 is required, the partial reflector must largely preserve the desired optical performance when subjected to the forming process. For example, in the event that a physical vapor deposited (PVD) partial reflector is used, it cannot (e.g.) craze (crack or shatter) when thermoformed. In the event that this is not practical, the partial reflector can be omitted from the flat lamination, with the partial reflector coating applied to the inner surface after forming.

If additional substrates are required to provide mechanical support, they can be integrated into the flat lamination of each layer, or they can be applied after forming. In any case, it may be preferred that support substrates be placed outside of the polarization-management structure, such that birefringence issues are mitigated. For example, a mechanical support substrate can be placed before (outside) the linear polarizer of Layer 1, such that the partial reflector forms an inner surface of the cavity. Similarly, a mechanical support substrate can be placed after (outside) the reflective polarizer of Layer 2, such that QW2 forms an inner surface of the cavity. In the event that mechanical support substrates are required between the input polarizer and the reflective polarizer, they should be substantially isotropic. For example, triacetyl cellulose (TAC) shows relatively little in-plane birefringence when thermoformed, though it does exhibit some negative c-plate retardation as-cast. A c-plate is a uniaxial retarder with optic axis normal to the substrate. However, there are isotropic substrates, such as Z-TAC (by Fuji), which have substantially zero in-plane and thickness-direction retardation. An example alternative is a high molecular weight (e.g.) polycarbonate resin, which is stretched to produce a few thousand nanometers of retardation along the axis of the adjacent polarizer. The stretching provides a well-defined optic axis, such that the forming process does little to rotate it and it is functionally isotropic. If the support substrate is applied using injection molding, it may be a material that tends to have low birefringence. For example, resins that are either intrinsically isotropic or can be annealed to mitigate birefringence may be preferred. Also, materials such as polyurethanes that can cross-link near room-temperature may show minimal retardation. Again, it may be preferable that mechanical support substrates are placed outside of the path where polarization management is critical. In the usual manner, antireflective coatings can also be applied to all exposed surfaces to further mitigate the effects of Fresnel reflections. These coatings can be applied either before or after thermoforming.

As an alternative, first quarter-wave (QW1) and second quarter-wave (QW2) retarders need not be placed on opposing substrates (on opposed sides of the cavity). For example, QW1 and QW2 can both be laminated to the substrate containing the partial reflector, on opposite sides of the partial reflector.

In an exemplary polarization management design, pure circular polarization is output by QW1, with pure linear polarization output by QW2 in the forward-pass. This may use a single or multi-layer achromatic retarder stack to convert from linear-to-circular and from circular-to-linear over the spectral range of use (e.g. 400-700 nm). These polarization conversions can be accomplished via (e.g.) achromatic polarization basis-vector transformations as described in U.S. Provisional Patent Application No. 62/637,832, entitled "Retarder Stack Pairs for Polarization Basis Vector Transformations," which is incorporated by reference. An exemplary combination of polarization transformations may further accomplish this over the full range of incidence angles.

Figure 3:
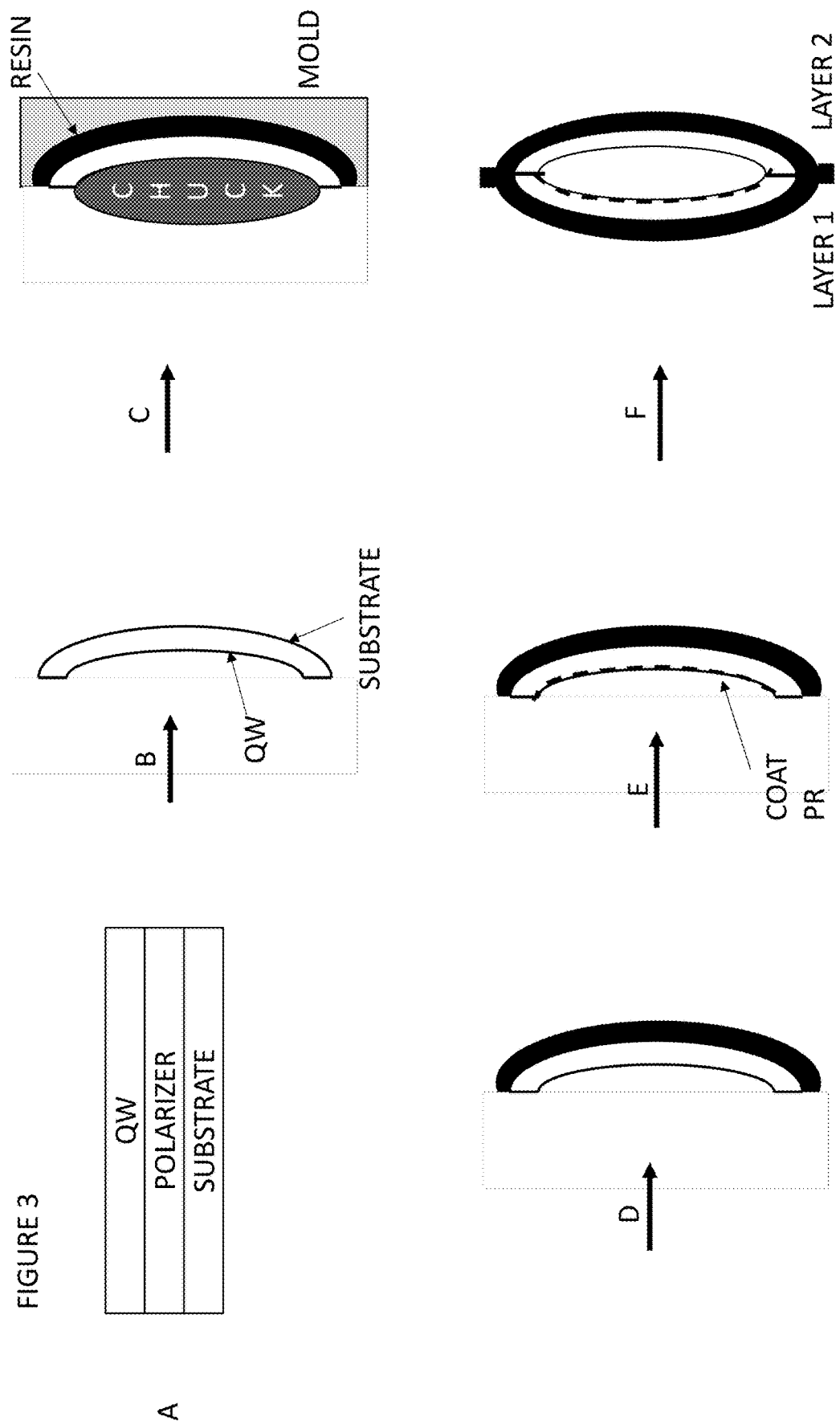
FIG. 3 shows a sequence of manufacturing steps in which a triple-pass optical system may be manufactured.

Mechanical support substrates can also be applied after forming, either before or after joining the layers. They can be applied in a single step after forming to also serve the role of perimeter joining. That is, the external (e.g. injection molded) material can encapsulate Layer 1 and Layer 2. An example of this type of mechanical support uses insert molding as shown in FIG. 3. A thermoformed layer can be placed in a mold cavity, with matched curvature, and fixtured using (e.g.) a vacuum chuck. A second mold surface forms a mold cavity. This surface may introduce a prescribed refractive power, or it may introduce no refractive power after injection molding. A resin is injected between the formed part and the mold surface to create a mechanical support substrate. The resin is preferably isotropic, though because it is deposited outside of the polarization-management structure, the specification for birefringence is typically much more relaxed. The resin may be introduced above the glass transition temperature of the resin, or it may be a monomer that crosslinks at relatively low temperature. The resin bonds to the surface of the formed layer. After curing, the part is ejected from the cavity and the geometry of the inner surface is substantially preserved. The injection-molded resin may further include perimeter features used to facilitate fastening the first and second thermoformed parts. Fasteners may be (e.g.) mechanical, adhesive-based, chemical welding, thermal-welding, or RF welding. The fastening of first and second parts may form a sealed unit that protects the optics from moisture, residue, particulates, and damage due to handling. It may further create a mechanically robust package that preserves optical characteristics under mechanical load.

An advantage of insert-molding is that it can lock in the desired local surface normal of the reflective layer (or surface that later receives a reflective coating). For example, a thin Layer 1 or Layer 2 may not preserve the desired shape after initial thermoforming. When it "springs" from the mold surface, with possible residual stress, it may relax and assume a shape that is not exactly conformal to the mold. The distortion of the reflective surface can compromise optical performance. This can be mitigated by modifying the mold shape to anticipate and compensate for the effect, though this may not give adequate control. By injection molding while the formed part is under load and conformal to the mold, the additional support of the substrate material can provide better fidelity of the final layer curvature after release. The fastening of the first and second layer can further be used to define and maintain the local surface normal of each reflective layer.

Thin compound-curved Layer 1 and Layer 2 may have insufficient mechanical support, such that a mechanical load significantly impacts the reflected wavefront distortion and therefore the performance of the HTP system. This issue can be largely overcome according to the invention by mechanically constraining the perimeter of Layer 1 and Layer 2. Consider the case where the optical elements are circular and one or both have compound curvature. The radii of curvature are such that joining the elements always forms an air-spaced cavity, per the invention. Constraining the perimeter can be accomplished directly by joining the two elements, or indirectly by placing each element in a ring-shaped frame (or the like) that constrains the perimeter. Joining Layer 1 and Layer 2 directly can be accomplished adhesively, chemically/mechanically using welding, etc. Regardless, the action of constraining the perimeter of each element ensures a much more robust optical performance.

In some preferred embodiments, the desired optical power is achieved by thermoforming both Layer 1 and Layer 2. This, along with constraining the perimeter, provides a package with more robust optical performance under mechanical load. Even a small base curve (e.g. 1-2 diopter) formed into a layer can provide a significant advantage in preserving overall performance under mechanical load relative to a plano layer. A plano layer may require substantially greater thickness in order to accomplish equivalent mechanical support.

FIG. 3 shows a sequence of manufacturing steps for making an embodiment of the invention, with convex outer surfaces (i.e., concave reflective elements). In process step A, the films of Layer 1 are bonded together to form a flat laminate. The adhesive for laminating the layers is preferably compatible with the forming process, such as bondline thickness, bond-strength, durometer, and glass-transition temperature. Not shown is a similar process for forming Layer 2. In process step B, the flat laminates are cut to a prescribed part geometry from the mother-sheet and thermoformed to a prescribed compound curvature. The thin formed units are then inserted into a mold where a vacuum chuck, matched in curvature to the original thermoforming mold, holds the part in a conformal manner. A resin is injected between the part and a mold surface of prescribed geometry. Process step C creates an outer substrate that supports the thin part. Step D simply shows the insert molded part ejected from the mold. Process step E shows a PVD partial-reflector coating applied to the concave surface of Layer 1 (note that Layer 1 is flipped around before process step F). Not shown is a possible AR coating applied to the concave (QW) surface of Layer 2. Process step F shows the perimeter joining of the two layers to produce a bi-convex HTP system, with bi-concave internal reflectors. Not shown is the possible AR coating of both outer surfaces of the assembled HTP system.

Figure 4B:
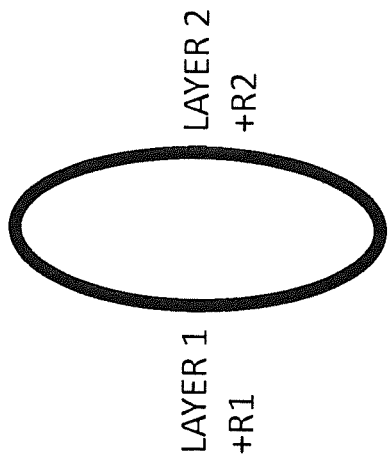
FIGS. 4a, 4b, 4c, and 4d show different possible curvatures for the two layers of a triple-pass optical system.
Figure 4D:
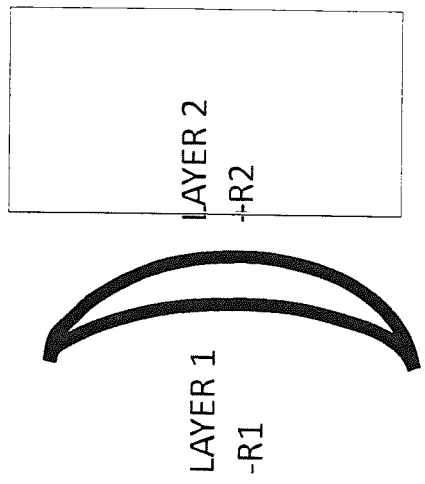
Figure 4A:
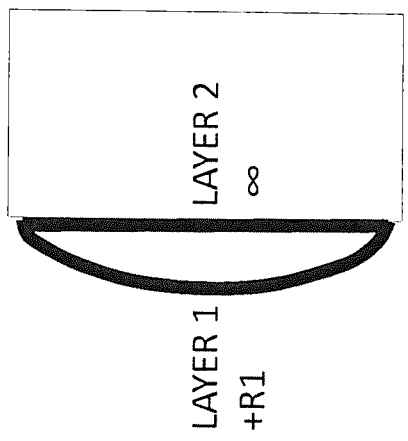
Figure 4C:
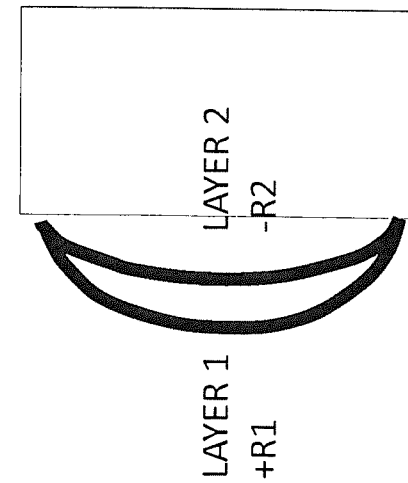

Various configurations for achieving prescribed triple-pass optical power can be produced via the selection of curvature of Layer 1 and Layer 2. Compound curvatures can be spherical, aspherical, toroidal, or the like. HTP systems can be produced using various combinations of, for example, plano, concave and convex layers as shown in FIG. 4. A convex (concave) Layer 1 surface represents a reflection from a concave (convex) mirror in the second pass. A convex (concave) Layer 2 surface represents a reflection from a concave (convex) mirror in the first pass. FIG. 4a shows the case where Layer 1 is convex, and Layer 2 is planar. As discussed previously, it may be necessary to increase the substrate thickness of Layer 2 for mechanical stability relative to that require for a compound curved unit. Alternatively, Layer 1 can be planar with Layer 2 convex. FIG. 4b shows the case of a bi-convex HTP lens, with arbitrary curvature for each layer. FIG. 4c shows the case where Layer 1 is convex and Layer 2 is concave. FIG. 4d shows the case where Layer 1 is concave and Layer 2 is convex. The invention includes all combinations of curvatures that result in a triple-pass optical system with an internal air space.

Figure 5:
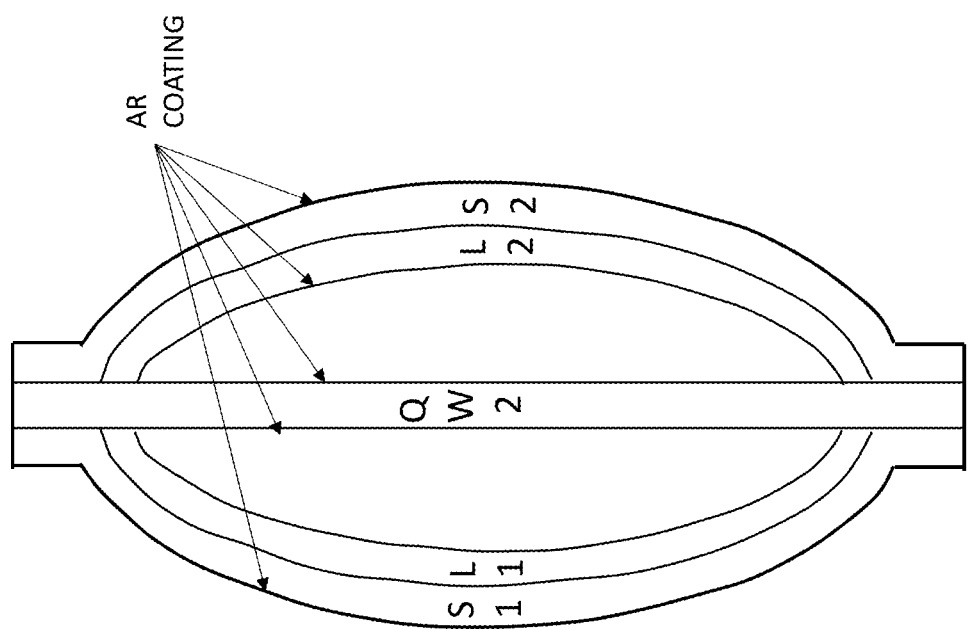
FIG. 5 shows a bi-convex HTP lens with Layer 1 and Layer 2 sealed at the perimeter, where a plano QW2 is placed between the layers.

The invention contemplates that additional (e.g. plano) optical elements may be inserted between Layer 1 and Layer 2 during assembly of the formed parts. For example, a plano QW2 (e.g. with double-side AR coating) on an isotropic substrate, may be placed between Layer 1 and Layer 2 during perimeter joining. In so doing, the need to thermoform QW2 is eliminated, which may improve the quality of polarization management. The configuration shown in FIG. 5 has external isotropic substrates (S1 and S2) which encapsulate functional layers L1 and L2. Layer 1 may include one or more of a linear polarizer, a quarter-wave retarder, and a partial reflector (in that order). Layer 2 may include one or more of a reflective polarizer and a linear polarizer (in that order). Antireflection coatings may be applied to the surfaces shown to improve performance. The configuration shown has two hollow cavities; one between L1 and QW2 and a second between QW2 and L2.

Figure 6:
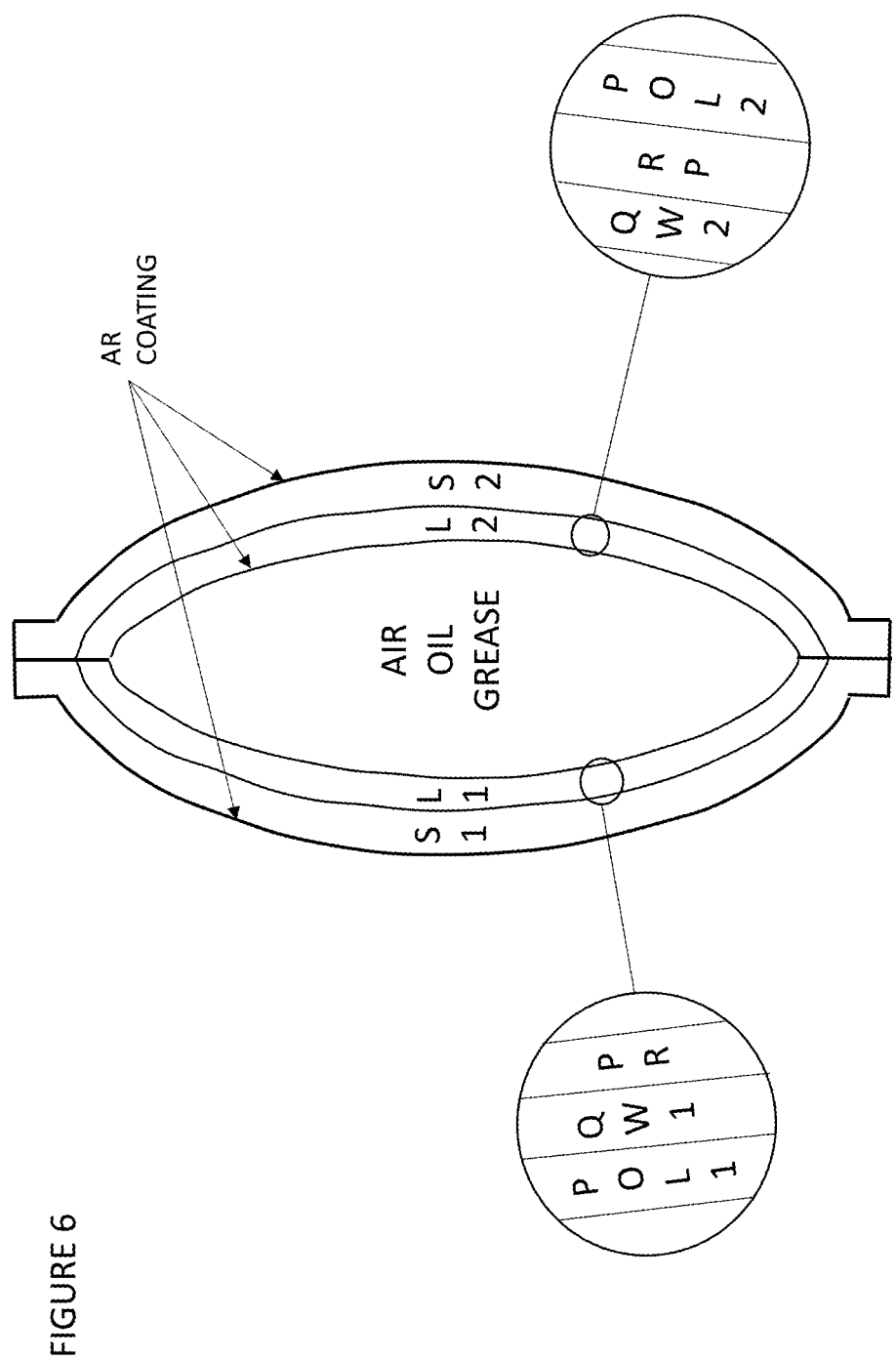
FIG. 6 shows a biconvex HTP lens filled with one of air, optical fluid, or grease.

The invention contemplates that the air-spaced cavity formed between Layer 1 and Layer 2 may be filled with an isotropic fluid or optical grease to provide an additional refractive power, as is illustrated in FIG. 6. Because this material is not cross-linked, it can be free of the usual birefringence concerns. A reservoir at the perimeter may further be required to manage conditions of changing pressure due to e.g. temperature change. The configuration shown in FIG. 6 has external isotropic substrates (S1 and S2) which encapsulate functional layers L1 and L2. Layer 1 may include one or more of a linear polarizer (POL1), a quarter-wave retarder (QW1), and a partial reflector (PR) (in that order). Layer 2 may include one or more of a quarter-wave retarder (QW2), a reflective polarizer (RP), and a linear polarizer (POL2) (in that order, as viewed in the drawing from left to right). In the event that one or more functional layers are omitted from the formed Layer 1 and Layer 2, they may be provided as an external optic. For instance, the optical system may provide a linear polarizer or linearly polarized input, allowing POL1 to be omitted from the Layer 1 stack. Antireflection coatings may be applied to the surfaces shown to improve performance.

The invention contemplates that additional functional layers may be added to improve system-level optical performance, as shown in Layer 2 of FIG. 6. For example, a linear or circular polarizer may be needed between the reflective polarizer and the exit medium to mitigate stray light. For example, ambient light originating from the environment or originating from the optical system can be reduced using an exit linear or circular polarizer. Such an element can be added to the Layer 2 laminate.

Figure 7:
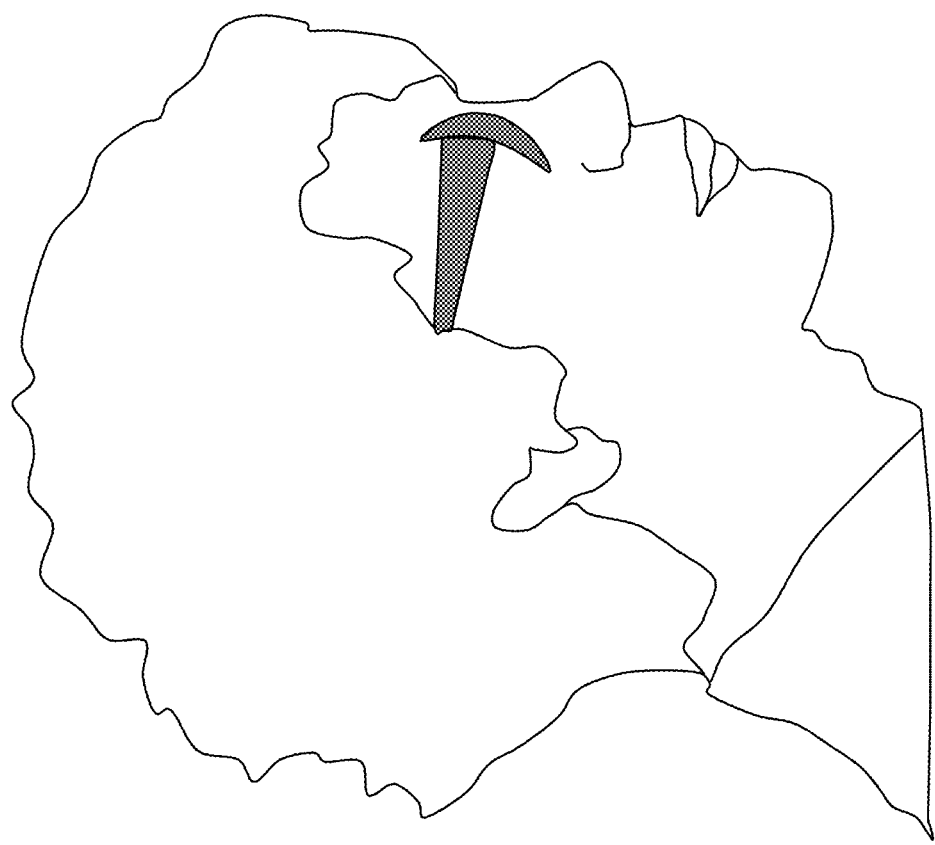
FIG. 7 shows a pair of eyewear incorporating the hollow triple-pass lens of the invention.

The hollow triple-pass lens of the invention may be used in any optical system where conventional refractive/reflective optical elements are used. This may be for the purpose of manipulating radiation, such as for concentrating, collimating, diffusing, displaying or image forming. FIG. 7 shows the example where the HTP lens is used for lightweight prescription sunglasses. The HTP lens could similarly be used for inspection magnifiers, readers, or augmented-reality glasses/headsets. Small HTP lenses could be embedded in another lens or transparent substrate for creating bifocal lenses.

Figure 8:
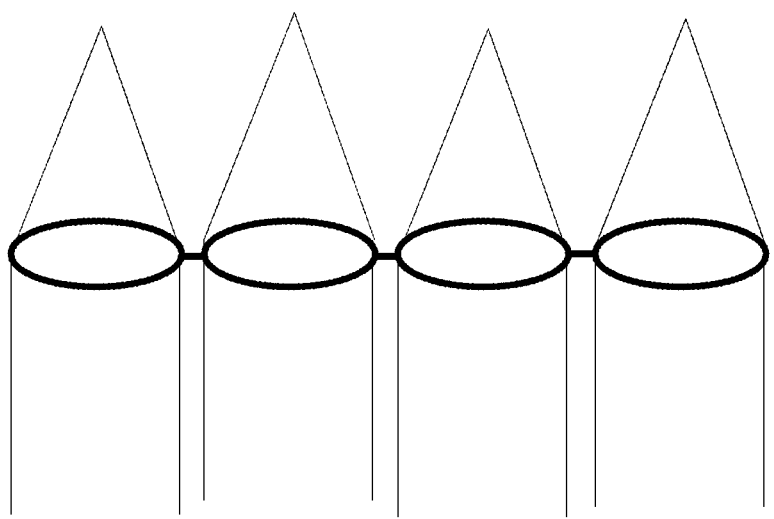
FIG. 8 shows an array of hollow triple-pass lenses for focusing light or for collimating an array of light sources.

More complex structures can be fabricated using the inventive concepts. For example, a two-dimensional array of small HTP lenses, shown in FIG. 8, can be created by registering an array of thermoformed Layer 1 structures with an array of thermoformed Layer 2 structures. Such lenslet arrays can be used to focus collimated light into an array of spots. Or conversely, the lenslet arrays can be used to collimate an array of point sources.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. An optical system, comprising:
   a first optical element configured so that light enters the optical system therethrough; and
   a second optical element retained against the first optical element;
   wherein each of the first optical element and the second optical element are non-planar and convex;
   wherein a hollow cavity is defined between the first optical element and the second optical element and the optical system created by the first optical element and the second optical element is bi-convex; and
   wherein each of the first optical element and the second optical element are configured to reflect light such that light will pass at least three times through the hollow cavity before exiting the optical system via the second optical element.

2. An optical system as defined in claim 1, wherein the first optical element includes a quarter-wave retarder and a partial reflector; and
   wherein the second optical element includes a quarter-wave retarder and a reflective polarizer.

3. An optical system as defined in claim 2, wherein the first optical element also includes a polarizer.

4. An optical system as defined in claim 1, further including a support substrate attached to at least one of the optical elements.

5. An optical system as defined in claim 4, wherein the support substrate is an isotropic substrate.

6. An optical system as defined in claim 4, wherein the support substrate is a resin.

7. An optical system as defined in claim 1, wherein the hollow cavity is at least partially filled with an isotropic optical fluid.

8. An optical system as defined in claim 1, further including an exit polarizer adjacent the second optical element.

9. An optical system as defined in claim 8, wherein the second optical element includes a planar quarter-wave retarder and a non-planar reflective polarizer.

10. An optical system as defined in claim 1, wherein the first optical element and the second optical element are joined together along perimeters thereof.

11. An optical system as defined in claim 1, wherein the first optical element includes a first linear polarizer, a quarter-wave retarder, and a partial reflector; and
    wherein the second optical element includes a quarter-wave retarder, a reflective polarizer, and a second linear polarizer.

12. An optical system as defined in claim 1, wherein the first optical element is a laminated structure that includes a first isotropic substrate, a first linear polarizer, a quarter-wave retarder, and a partial reflector; and wherein the second optical element is a laminated structure that includes a quarter-wave retarder, a reflective polarizer, a second linear polarizer, and a second isotropic substrate.

* * * * *